United States Patent
Takeyama et al.

(10) Patent No.: US 10,124,992 B2
(45) Date of Patent: Nov. 13, 2018

(54) ENDLESS HANDRAIL MANUFACTURING METHOD, ENDLESS HANDRAIL AND ESCALATOR

(71) Applicant: MITSUBISHI ELECTRIC CORPORATION, Chiyoda-ku, Tokyo (JP)

(72) Inventors: Hidetoshi Takeyama, Tokyo (JP); Atsuhiko Yoshida, Tokyo (JP); Fumiya Murata, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/128,688

(22) PCT Filed: May 29, 2015

(86) PCT No.: PCT/JP2015/065520
§ 371 (c)(1),
(2) Date: Sep. 23, 2016

(87) PCT Pub. No.: WO2015/182739
PCT Pub. Date: Dec. 3, 2015

(65) Prior Publication Data
US 2017/0166420 A1    Jun. 15, 2017

(30) Foreign Application Priority Data
May 30, 2014    (JP) .................................. 2014-112005

(51) Int. Cl.
*B66B 23/24*    (2006.01)
*B29C 65/72*    (2006.01)
(Continued)

(52) U.S. Cl.
CPC .............. *B66B 23/24* (2013.01); *B29C 65/48* (2013.01); *B29C 65/70* (2013.01); *B29C 65/72* (2013.01);
(Continued)

(58) Field of Classification Search
CPC ..... B29C 66/114; B29C 66/116; B66B 23/24; B66B 23/06; B66B 21/02; F16G 3/10
(Continued)

(56) References Cited

U.S. PATENT DOCUMENTS

| 5,552,005 A | 9/1996 | Mammino et al. |
| 6,086,806 A | 7/2000 | Weatherall et al. |

(Continued)

FOREIGN PATENT DOCUMENTS

| EP | 1 849 741 A1 | 10/2007 |
| JP | 49-068187 U | 6/1974 |

(Continued)

OTHER PUBLICATIONS

International Search Report (PCT/ISA/210) dated Sep. 1, 2015, by the Japanese Patent Office as the International Searching Authority for International Application No. PCT/JP2015/065520.
(Continued)

*Primary Examiner* — Gene O Crawford
*Assistant Examiner* — Lester III Rushin
(74) *Attorney, Agent, or Firm* — Buchanan Ingersoll & Rooney PC

(57) ABSTRACT

An endless handrail manufacturing method includes: a first step of cutting the dorsal part on one end side and the dorsal part on the other end side of a belt-like molded product to expose a tension member from the end portions; a second step of heating the product on the one end side, then removing the softened resin member, and then exposing a canvas from the end portion; a third step of heating the
(Continued)

product with a heating jig to dent the abdominal part; a fourth step of applying an adhesive to the terminal on the one end side or the terminal on the other end side of the product, then fitting the former terminal to the latter terminal of the product; and a fifth step of supplementing a resin to the fitting portion, then hot pressing the fitting portion to fusion-bond the terminals.

14 Claims, 10 Drawing Sheets

(51) Int. Cl.
    *B29C 65/48*     (2006.01)
    *B29C 65/70*     (2006.01)
    *B29C 65/00*     (2006.01)
    *B29D 29/00*     (2006.01)
    *B29L 29/00*     (2006.01)

(52) U.S. Cl.
    CPC .... *B29C 66/02241* (2013.01); *B29C 66/1282* (2013.01); *B29C 66/1284* (2013.01); *B29D 29/00* (2013.01); *B29L 2029/00* (2013.01)

(58) Field of Classification Search
    USPC ....... 198/337; 425/112, 505; 264/173.1, 175
    See application file for complete search history.

(56) References Cited

U.S. PATENT DOCUMENTS

| | | |
|---|---|---|
| 6,761,259 B1 | 7/2004 | Onodera et al. |
| 2010/0181164 A1 | 7/2010 | Kawasaki et al. |
| 2015/0210512 A1 | 7/2015 | Kawasaki |

FOREIGN PATENT DOCUMENTS

| | | |
|---|---|---|
| JP | 5-269849 A | 10/1993 |
| JP | 2000-86137 A | 3/2000 |
| JP | 2000-507893 A | 6/2000 |
| JP | 2000-226177 A | 8/2000 |
| JP | 2002-265180 A | 9/2002 |
| JP | 2004-224504 A | 8/2004 |
| JP | 2004-250154 A | 9/2004 |
| JP | 2008-201496 A | 9/2008 |
| JP | 2008-241031 A | 10/2008 |
| JP | 2012-126538 A | 7/2012 |
| JP | 2013-129523 A | 7/2013 |
| WO | WO 2006/087801 A1 | 8/2006 |
| WO | WO 2009/001456 A1 | 12/2008 |
| WO | WO 2014/027393 A1 | 2/2014 |

OTHER PUBLICATIONS

Written Opinion (PCT/ISA/237) dated Sep. 1, 2015, by the Japanese Patent Office as the International Searching Authority for International Application No. PCT/JP2015/065520.

| Endless Structure \ Flexural Rigidity of Handrail | Main Body Flexural Rigidity (kN·cm²) | Joint Flexural Rigidity (kN·cm²) | Ratio of Flexural Rigidity (Joint/Main Body) |
|---|---|---|---|
| Patch-type Endless Structure | 20 | 45 | 2.3 |
| Lap-type Endless Structure (Lap Part Length: 50 mm) | 20 | 34 | 1.7 |
| Lap-type Endless Structure (Lap Part Length: 20 mm) | 20 | 26 | 1.3 |

ENDLESS HANDRAIL MANUFACTURING METHOD, ENDLESS HANDRAIL AND ESCALATOR

BACKGROUND OF THE INVENTION

The present invention relates to an endless handrail manufacturing method, an endless handrail and an escalator.

BACKGROUND ART

An endless handrail of an escalator is made of a belt-like molded product previously molded in bulk by extrusion molding (for example, see PTLs 1-6). The belt-like molded product is made of multiple materials, such as canvas, thermoplastic resin and tension member, and is cut to the length specified by a customer, then joined into a ring shape, so, the endless handrail includes one joint (seam). The joint of the endless handrail is formed by thermal-fusion-bonding both thermoplastic resin members of the cut end portions together.

In the escalator handrail made of multiple materials, in order to satisfy the strength requirement of the seam of the canvas of the under side of the handrail and to protect the seam of the canvas from a handrail guide or the like, a patch is generally bonded to the endless joint. The patch is bonded to the canvas by hot pressing so as to follow the handrail shape, from the outside of the belt edge to the inner surface of the belt edge of the handrail, which is made of thermoplastic resin and canvas and is shaped beforehand. In the patch-type endless joint, bonding the patch causes the canvas to be pressed into the far inside of the handrail, in comparison with the normal part of the handrail.

The patch is bonded over the seam of the canvas, and the canvas is discontinuous at the seam of the canvas. With the canvas having the seam, when the patch is bonded over the seam, the patch presses the canvas into the inside of the handrail, causing the canvas to be moved into the inside of the handrail. This causes a shortage of length at the seam of the canvas, which naturally causes a canvas gap at the seam of the canvas. In the canvas gap, an area in which the canvas does not exist under the patch locally exists. So, when the endless handrail is wound around a sheave or the like for driving the escalator and bent, distortion is concentrated at the canvas gap under the patch, deforming the canvas gap to be swelled up.

A gap has occurred at the butt part of the canvas seam because of the heat expansion of the resin in mold pressing and the partial change in the laminate structure due to increase in the thickness caused by the patch. At the seam, the laminate structure changes locally, which causes difference in rigidity at the canvas seam, causing distortion to be concentrated at the canvas seam when the endless handrail is bent. As a result, the patch is locally deformed at the canvas seam, which may cause the patch to fall off, leading to crack or destruction of the endless handrail body.

In a moving handrail for passenger conveyor, a metallic belt-like tension member is continuously provided in the longitudinal direction of a core body including a thermoplastic elastomer (for example, see PTL 1). Both ends of the moving handrail for passenger conveyor are joined together at the joint. At both ends of the belt-like tension member, a first lap part and a second lap part are provided lapped with each other in the thickness direction at the joint. At both tips of the first lap part and the second lap part, a taper part with the width gradually reduced is provided.

CITATION LIST

Patent Literature

PTL 1 WO2006/087801
PTL 2 JP-A-2002-265180
PTL 3 JP-A-2004-250154
PTL 4 JP-A-2000-86137
PTL 5 JP-A-2000-226177
PTL 6 JP-A-2008-201496

SUMMARY OF INVENTION

As described above, the endless joint is provided to the handrail of the escalator. The thermoplastic resin part of the endless joint is joined by thermal fusion bonding. Since the canvas surface of the under side of the handrail includes the exposed seam, in order to reinforce the seam of the canvas and to protect the seam of the canvas from the handrail guide or the like, the patch is generally bonded so as to mask the joint. However, at the endless joint, the partial change in the laminate structure due to heat expansion of the resin in mold pressing and increase in the thickness caused by the patch causes the butt part of the canvas seam to be pressed into the inside of the handrail, causing a gap at the canvas gap. Even though the seam is protected by the patch, the laminate structure of the area in which the gap of the canvas seam exists under the patch locally changes to cause local difference in rigidity at the canvas seam.

When the endless handrail is wound around the sheave or the like for driving the escalator and bent, distortion is concentrated at the handrail, deforming the canvas seam of the belt edge of the handrail to be swelled up. This continues to cause the patch to be locally deformed at the canvas seam, which causes the patch to fall off due to its fatigue and deterioration, leading to crack or destruction of the handrail body. In order to solve the above problem, it is an object of the present invention to eliminate local distortion at the seam of the canvas and reduce the area in which the rigidity increases, thereby improving the reliability of the handrail joint.

The endless handrail manufacturing method in accordance with the invention includes: a first step of cutting the dorsal part on one end side and the dorsal part on the other end side of a belt-like molded product to expose a tension member on the one end side and a tension member on the other end side from the respective end portions; a second step of heating the belt-like molded product after the first step on the one end side, then removing the resin member softened by the heating on the one end side over a defined width from the end face, and then exposing a canvas from the end portion on the one end side of the belt-like molded product; a third step of heating the belt-like molded product after the first step on the other end side with a heating jig attached to the abdominal part to dent the abdominal part on the other end side of the belt-like molded product lower than the surrounding area; a fourth step of applying an adhesive to the terminal on the one end side of the belt-like molded product formed through the second step or the terminal on the other end side of the belt-like molded product formed through the third step, then fitting the terminal on the one end side to the terminal on the other end side of the belt-like molded product; and a fifth step of supplementing a resin to the fitting portion of the belt-like molded product formed through the fourth step, then hot pressing the fitting portion supplemented with the resin to fusion-bond the terminal on the one end side to the terminal on the other end side.

According to the endless handrail in accordance with the invention, both ends of the canvas of the canvas lap part are lapped with each other, which prevents a gap from occurring at the seam of the canvas, eliminating the discontinuity of the canvas over the whole circumference of the handrail. Even when the endless handrail is wound around a sheave or the like for driving the escalator and bent, local distortion can be prevented, providing an effect of improving the reliability of the endless joint.

DETAILED DESCRIPTION OF THE INVENTION

An embodiment of an escalator and an endless handrail of the escalator in accordance with the invention is described below in detail with reference to the drawings. Note that the invention is not limited to the description below and may be appropriately modified without departing from the spirit of the invention.

First Embodiment

Figure 1:
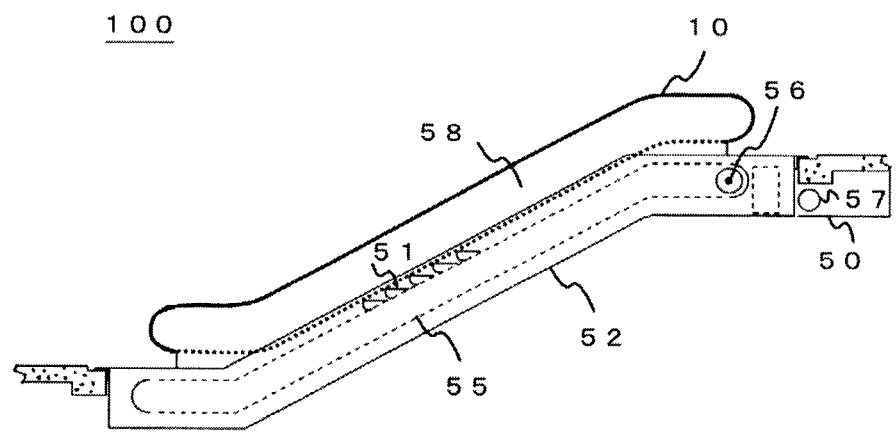
FIG. 1 A configuration diagram showing the overall view of an escalator in accordance with an embodiment of the invention.

FIG. 1 is a configuration diagram showing the overall view of an escalator in accordance with an embodiment of the invention. An escalator 100 includes an endless handrail 10, a machine room 50, steps 51, a main frame 52, a step drive chain 55, a main shaft 56, a driving machine 57, a panel 58 and the like. The main frame 52 is bridged between adjacent upper and lower floors and supports the weight of the escalator itself and a passenger. The main shaft 56 rotates to cause the steps 51 to move continuously. The driving machine 57 is provided in the machine room 50 of the escalator 100. The driving force of the driving machine 57 is transmitted to the main shaft 56 via a drive chain. The steps 51 are concatenated in an endless manner. The rotational movement of the main shaft 56 is transmitted to the steps 51 via the step drive chain 55. A passenger of the escalator 100 uses the endless handrail 10 as an assistance in moving up and down. The panel 58 is provided for the safety of the passenger.

Figure 2:
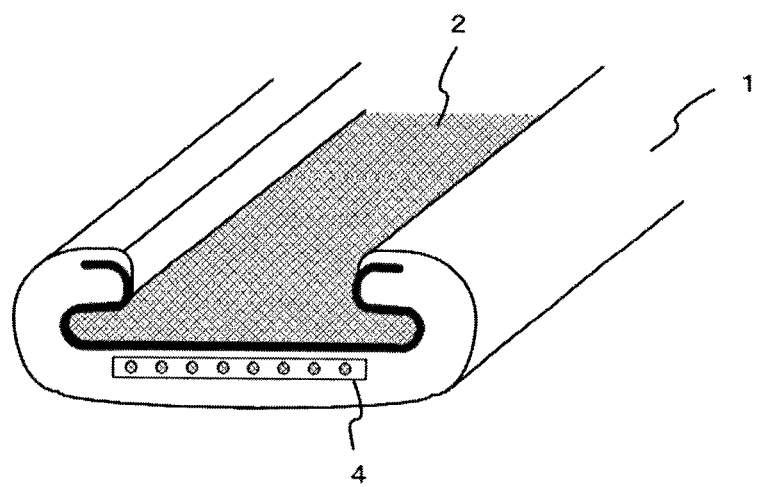
FIG. 2 A perspective view showing the structure of the endless handrail in accordance with the embodiment of the invention.

FIG. 2 is a perspective view showing the configuration of the endless handrail of the escalator. The endless handrail 10 includes a thermoplastic resin member 1, a canvas 2, a tension member 4 and the like. The inner side (under side) of the thermoplastic resin member 1 is covered over the whole circumference with the canvas 2 that is a thick fabric containing cotton, hemp, polyester and the like. The tension member 4 includes a plurality of coated wires. Urethane resin or the like is used for the thermoplastic resin member 1. The thermoplastic resin member 1, the canvas 2 and the tension member 4 are integrated together by extrusion molding. The metallic tension member 4 is inserted in order to improve the strength of the endless handrail.

Figure 3:
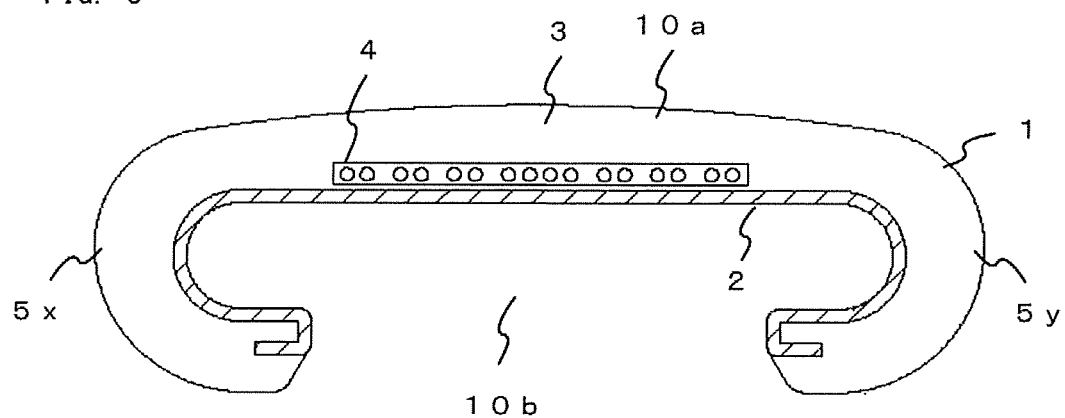
FIG. 3 A cross-sectional view showing the structure of the endless handrail in accordance with the embodiment of the invention.

FIG. 3 is a cross-sectional view showing the configuration of the endless handrail of the escalator. Referring to the cross-sectional shape, the endless handrail 10 includes a main body (flat portion) 3, a belt edge (first curved portion) 5x and a belt edge (second curved portion) 5y. The belt edge 5x and the belt edge 5y are formed with the main body 3 in between and curved with a convex on the outside. The belt edge 5x and the belt edge 5y, opposing each other, are constituted of the pre-shaped thermoplastic resin member 1 and canvas 2, and are shaped along the shape of a handrail guide of the escalator. The endless handrail 10 includes a dorsal part 10a and an abdominal part 10b.

Figure 4:
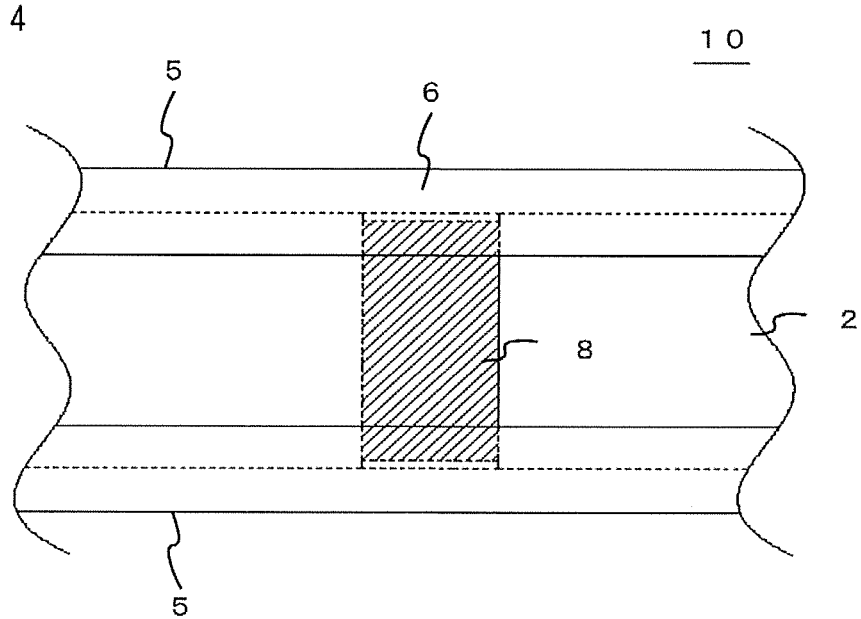
FIG. 4 A top view showing a joint of the endless handrail in accordance with a first embodiment of the invention.

The endless handrail 10 is made of several hundred meters of a belt-like molded product previously molded in bulk by extrusion molding. The belt-like molded product is cut to the length specified by a customer, then joined into a ring shape. The endless handrail 10 joined in the ring shape inevitably includes one joint. The joint in accordance with the embodiment has a lap-type structure in which the canvas ends are lapped with each other. FIG. 4 is a top view showing the lap-type structure of the endless handrail. In a canvas lap part 6, a lap side canvas 8 is bonded with an adhesive so as to cover the canvas 2 over the whole circumference. The lap side canvas 8 is secured in the length direction of the handrail, eliminating a gap of the canvas seam.

Figure 5:
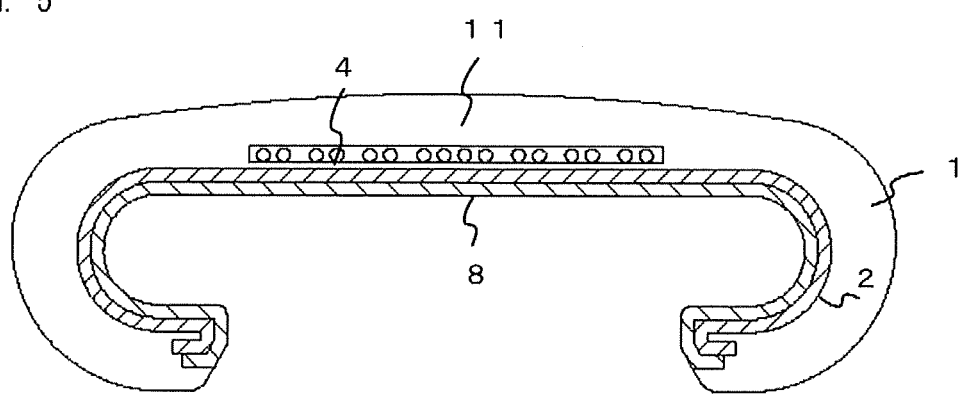
FIG. 5 A cross-sectional view showing the joint of the endless handrail in accordance with the embodiment of the invention.

FIG. 5 is a cross-sectional view showing the joint (canvas lap part) of the endless handrail. In the canvas lap part, the canvas 2 and the lap side canvas 8 are bonded to and lapped with each other. This lap-type endless structure avoids occurrence of a gap and concentration of distortion at the canvas seam, which allows the bonding area to be minimized. Discontinuity of the canvas 2 is eliminated over the whole circumference of the endless handrail, which avoids concentration of distortion also when the endless handrail is wound around a sheave or the like and bent. As a result, falling off of the adhesive due to local distortion of the endless handrail can be eliminated, providing an effect of improving the reliability of the joint (canvas lap part).

In an endless structure using a patch, when the handrail is wound around a sheave or the like for driving the escalator and bent, a gap occurs at the canvas seam. In order to disperse distortion concentrating at the canvas gap and to secure the bonding area of the patch, the patch needs a length of 100 mm or more in the length direction of the handrail. On the other hand, in the lap-type endless structure according to the embodiment, no gap occurs and distortion does not concentrate at the canvas seam, so, the bonding area can be minimized. Since the length of the canvas lap part 6 can be 50 mm or less, the area in which the rigidity of the joint increases can be reduced, which improves the capability of following the curvature of the sheave or the like, providing an effect of improving the reliability of the endless handrail.

Figure 6:
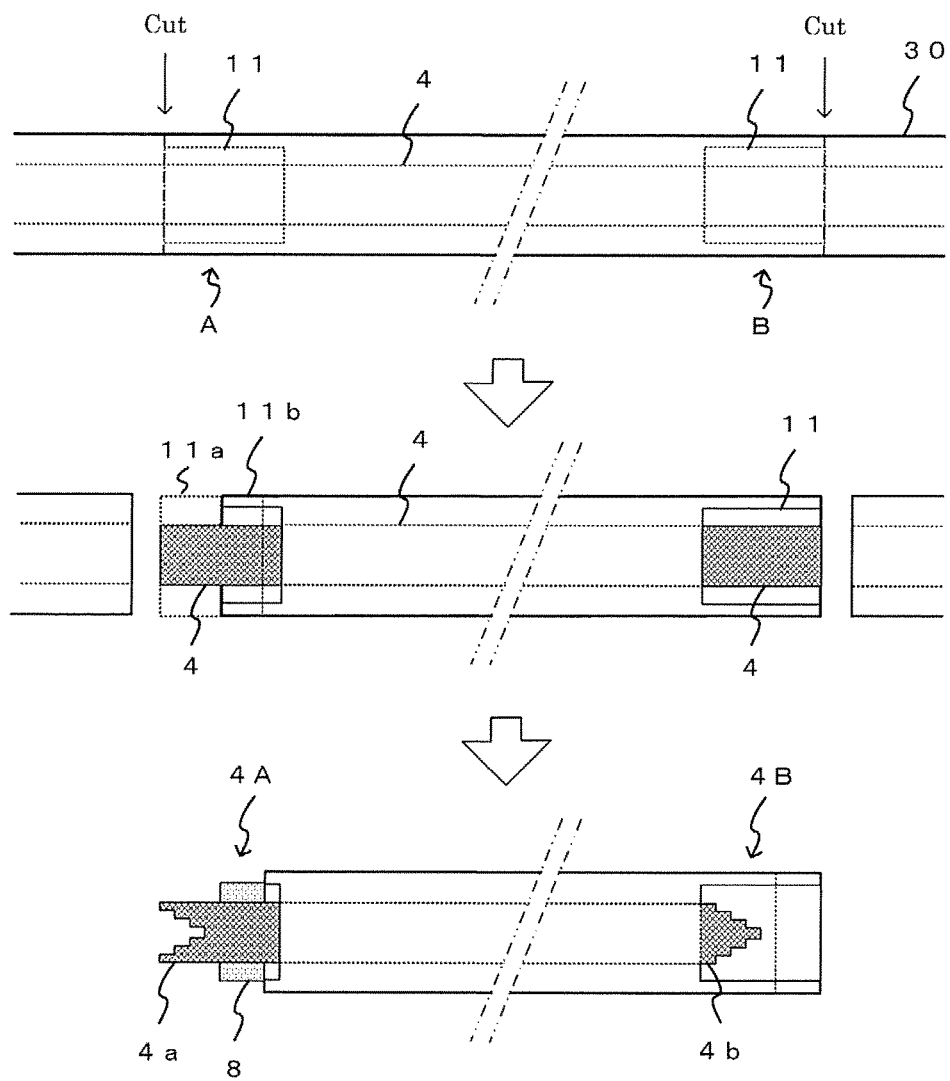
FIG. 6 A flowchart showing a method of manufacturing the endless handrail in accordance with the embodiment of the invention.

Next, a method of manufacturing the endless handrail having the lap-type endless structure is described with reference to FIG. 6. In order to make the canvas lap part, both ends of a belt-like molded product 30 are subjected to terminal processing before endless joining. First, the belt-like molded product 30 molded by extrusion molding is prepared and cut at both ends to a specified length. Here, the end portion on the left in the figure is a terminal A on the lapped canvas side, and the end portion on the right is a terminal B on the lapping canvas side. At both terminals, a urethane resin 11 is cut out from the dorsal part (top side of the handrail) by the length of 300 mm or so. At both terminals, the tension member 4 is exposed with the urethane resin 11 cut out from the dorsal part.

At the terminal A on the lapped canvas side, after the dorsal part of the main body (urethane resin 11 of the top side of the handrail) is cut out from the extrusion-molded belt-like molded product, a removed part 11a is cut out so that the tension member 4 projects from the end portion. At this time, the tension member 4 is separated from the thermoplastic resin member 1 (canvas 2) in a belt shape using a heated knife, then the tip of the tension member 4 is cut into a shape for joining. Furthermore, at a removed part 11b, the urethane resin is removed to cause the lap side canvas 8 to be exposed. At the terminal B on the lapping canvas side, after the urethane resin 11 of the top side of the handrail is cut out, the tension member 4 is separated from the canvas 2 in a belt shape using a heated knife, then the tension member 4 is cut into a shape for joining. At this time, an engagement part 4a and an engagement part 4b are formed in the tension member 4A of the terminal A and tension member 4B of the terminal B, respectively. In the figure, a concave portion is formed as the engagement part 4a in the tension member of the terminal A. On the other hand, a convex portion is formed as the engagement part 4b in the tension member of the terminal B. The engagement part 4a can be fitted to the engagement part 4b.

Figure 7:
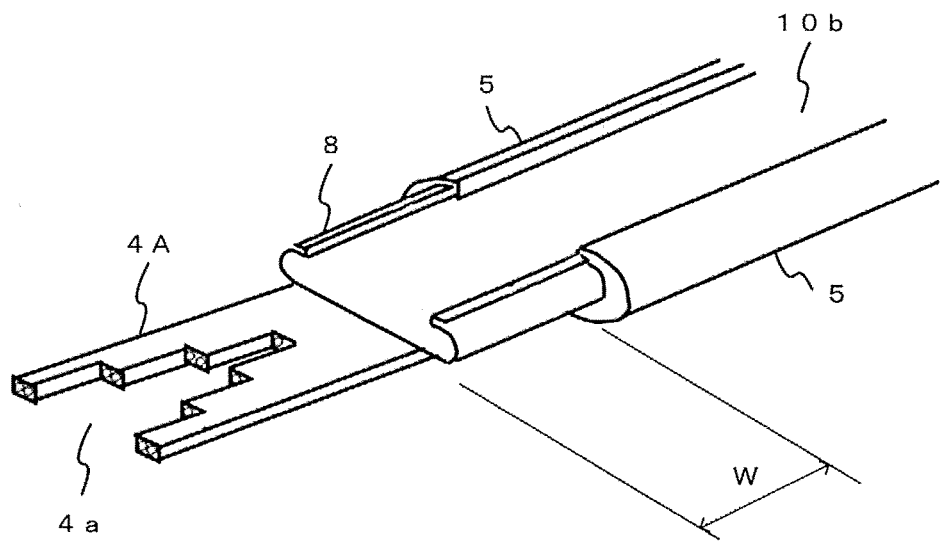
FIG. 7 A perspective view showing a terminal A in accordance with the embodiment of the invention.

FIG. 7 is a diagram showing the finished terminal A on the lapped canvas side. At the terminal A, the lap side canvas 8 is exposed over a defined width (W). The tension member 4A including the engagement part 4a projects further than the lap side canvas 8. In the tension member 4A, a three-step concave portion is formed as the engagement part 4a. In order to expose the lap side canvas 8 from the thermoplastic resin member 1, a heating block is inserted into the abdominal part 10b and the thermoplastic resin member 1 is heated via the canvas 2 to soften the thermoplastic resin member 1.

Figure 8:
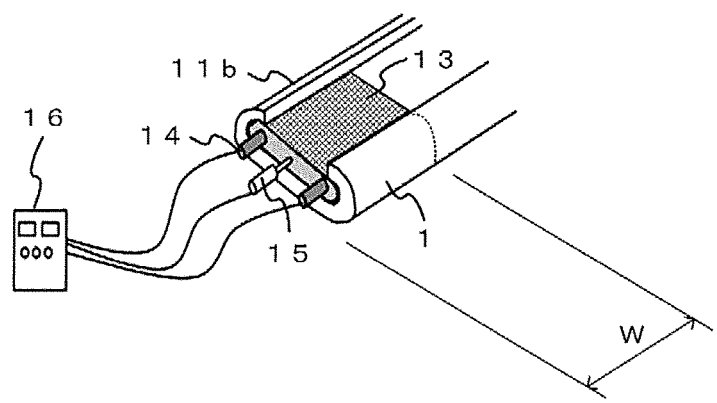
FIG. 8 A perspective view showing how to use a heating block for exposing a canvas.

FIG. 8 shows how to use the heating block that is used in order to expose the canvas at the terminal A on the lapped canvas side. In this figure, the tension member 4 is not shown. The heating block 13 used at the terminal A has a defined length (W). The heating block 13 includes a cartridge heater 14 and a thermocouple 15 which are connected to a temperature controller 16. The heating block 13 can be controlled to be at a predetermined temperature by operating the temperature controller 16. Heating the removed part 11b via the canvas 2 softens the thermoplastic resin member 1 of the removed part 11b.

The temperature of the heating block 13 is set to around 180° C. at which the canvas 2 does not change in property to be hardened and the thermoplastic resin member 1 is softened. After the heating is finished, a cool-temperature portion of the terminal A is chucked, then the thermoplastic resin of the removed part 11b is peeled off or scraped with a scraper. With the heating temperature set to around 180° C., the thermoplastic resin of the removed part 11b can be removed to expose the canvas without hardening or tearing the canvas.

Figure 9:
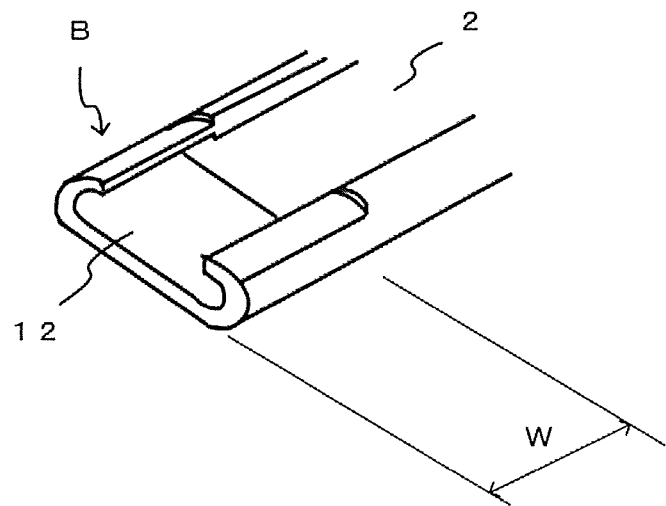
FIG. 9 A perspective view showing a terminal B in accordance with the embodiment of the invention.

FIG. 9 is a diagram showing the finished terminal B on the lapping canvas side. At the terminal B, after the urethane resin of the top side of the handrail is cut out, the tension member 4 is separated from the canvas 2 in a belt shape using a heated knife, then the tension member 4 is cut into a shape for joining. After that, a portion lapping the canvas of the terminal is heated and pressurized using a terminal denting jig to form a canvas dent 12 having a thickness of the lap side canvas 8 and an adhesive at the terminal B.

Figure 10:
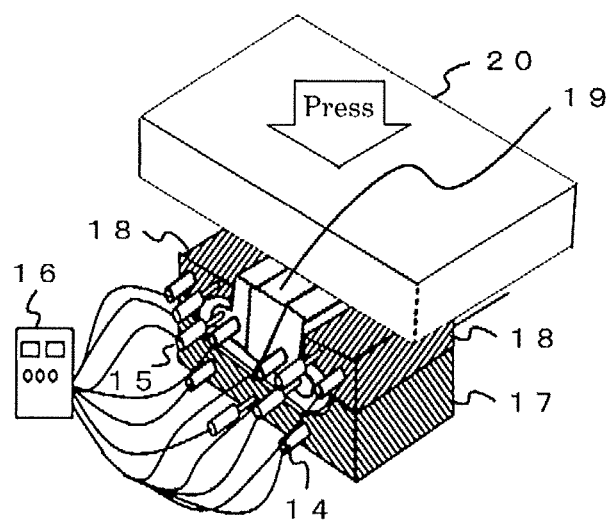
FIG. 10 A perspective view showing how to use a heating jig for terminal denting.

FIG. 10 shows how to use the terminal denting jig that is used in order to form the canvas dent 12 at the terminal B. The terminal denting jig (heating jig) is set on the portion lapping the canvas of the terminal B, then the portion is heated and pressurized to form a dent having a thickness of the canvas 2 and the adhesive at the terminal B. The terminal denting jig includes a lower die 17, an upper die 18 and a denting block 19, each of which includes the cartridge heater 14 and the thermocouple 15. The terminal denting jig is controlled to be at a predetermined temperature by operating the temperature controller 16.

How to use the terminal denting jig in denting is specifically described. With the outer shape of the handrail held unmovable by the lower die 17 and the upper die 18, the denting block 19 is pressurized from above by a pressurizer 20 and held, then, after a predetermined time elapses, the denting block 19 is cooled to near normal temperature. Then, the pressurizing is released, then the denting block 19 and the upper die 18 are detached, and then the terminal is taken out. Through finishing to a predetermined length, cutting and burring, the canvas dent 12 shown in FIG. 9 can be formed at the terminal B on the lapping canvas side.

Figure 11:
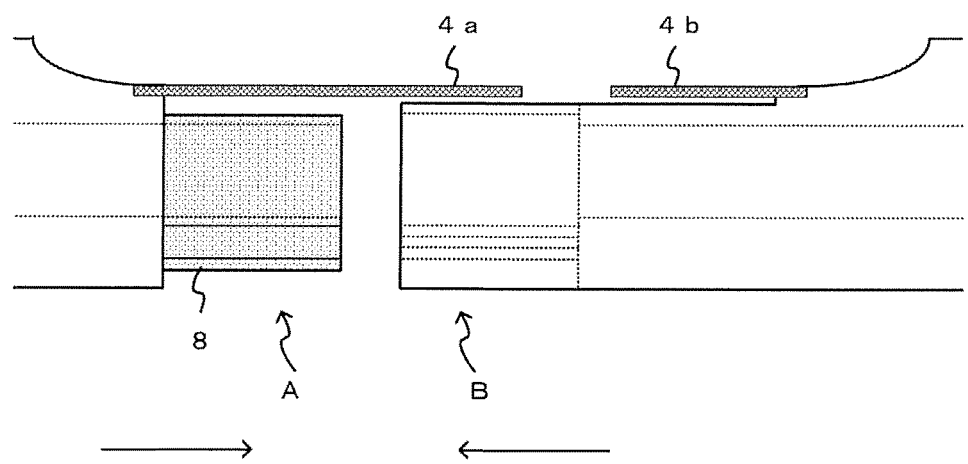
FIG. 11 A diagram showing a process of fitting the terminal A to the terminal B.

FIG. 11 shows a process of fitting the terminal A on the lapped canvas side to the terminal B on the lapping canvas side. An adhesive is applied to the lap side canvas 8 of the terminal A, then the lap side canvas 8 of the terminal A is inserted to the canvas dent 12 of the terminal B. Alternatively, an adhesive is applied to the canvas 2 of the terminal B, then the canvas dent 12 of the terminal B is inserted to the lap side canvas 8 of the terminal A. The lap side canvas 8 of the terminal A may also be inserted into the canvas dent 12 of the terminal B. When the terminal A is fitted to the terminal B, the engagement part 4a and the engagement part 4b abut against and are engaged with each other.

Figure 12:
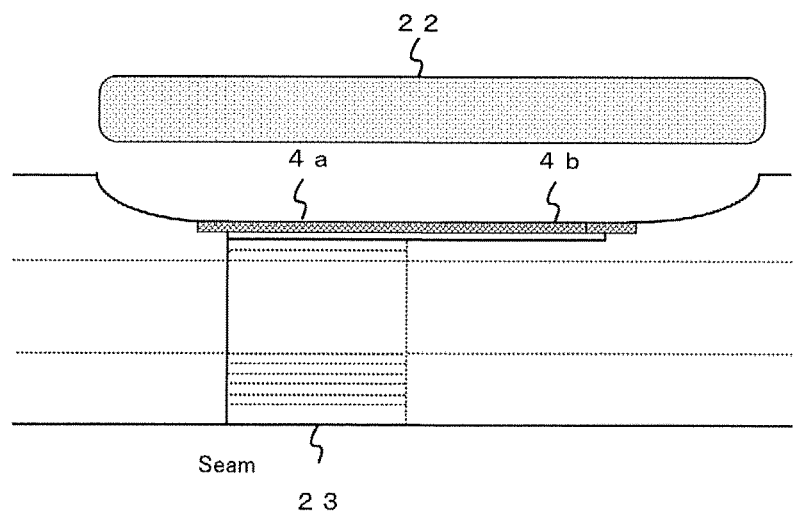
FIG. 12 A diagram showing a process of fusion-bonding the terminal A to the terminal B.

FIG. 12 shows a process of fusion-bonding a fitting portion 23 of the terminal A on the lapped canvas side and of the terminal B on the lapping canvas side. A supplement resin 22 is supplemented to the fitting portion 23 of the belt-like molded product. The top side of the handrail and the belt edge reduced due to the terminal processing are additionally given the supplement resin 22 thereon and shaped by hot pressing. A thermoplastic resin is used for the supplement resin 22 to be supplemented to the fitting portions 23 in fusion-bonding. The end face of the terminal B is fusion-bonded to the thermoplastic resin member 1 of the terminal A to form the seam of the endless joint.

Figure 13:
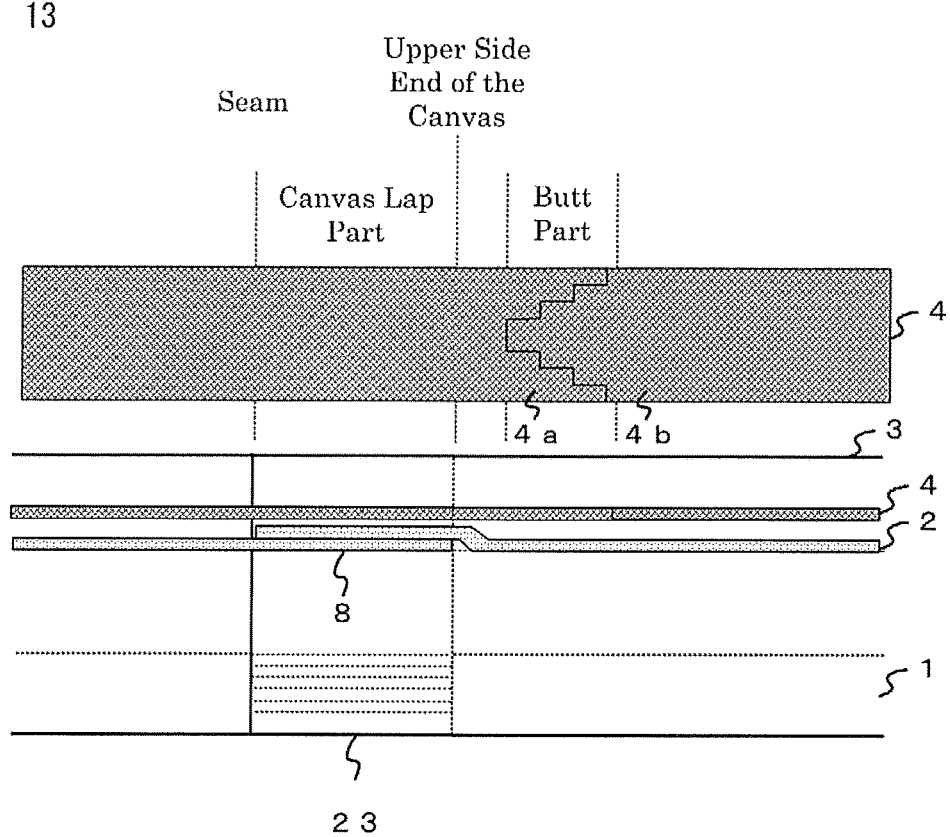
FIG. 13 A diagram illustrating a fitting portion of the endless handrail.

FIG. 13 shows a cross section of the fitting portion 23 of the terminal A and of the terminal B. The tension member 4 includes the engagement parts 4a, 4b formed at both ends and is buried in the flat portion 3 of the thermoplastic resin member 1. Both ends of the canvas 2 are lapped with each other at the canvas lap part 6, and the canvas of the terminal A is positioned on the upper side (inner side or abdominal part side) with respect to the canvas of the terminal B. The endpoint of the canvas of the terminal A is referred to as an upper side end of the canvas. The endpoint of the canvas of the terminal B is at the same position as the seam. Since the canvas dent 12 is formed at the terminal B, the canvas can be placed in a uniform shape even after shaping by hot pressing, which can secure stable bonding quality. The butt part of the engagement parts 4a, 4b is provided on the anti-canvas lap part side with respect to the upper side end of the canvas.

Note that, in using a thermoplastic adhesive for bonding the canvas lap part 6, even when the lap side canvas 8 of the terminal A on the lapped canvas side is inserted into the canvas dent 12 of the terminal B on the lapping canvas side, maintaining the shape of the lap side canvas 8 is difficult. As such, the thermoplastic adhesive is previously warmed up to have some viscosity on its surface, then inserted into the canvas lap part 6. Alternatively, the lap side canvas 8 can be temporarily fitted to the canvas dent 12 by softly pressurizing the canvas lap part 6 by hand, then the endless joint is shaped by hot pressing, which makes it possible to maintain the shape of the lap side canvas 8.

The above-described method allows the lap side canvas 8 to be placed in the canvas dent 12 in a uniform shape without causing fold or crinkle, and allows the adhesive to secure uniform film thickness between the canvas dent 12 and the lap side canvas 8. As a result, stable bonding quality can be secured, providing an effect of improving the reliability of the endless part. Furthermore, the area in which both ends of the canvas are lapped with each other can be smaller than the area of the patch, so, the area in which the rigidity of the endless joint increases can be reduced.

Furthermore, the dent having the thickness of one canvas and adhesive layer is formed at the terminal B, which can stabilize the canvas shape of the portion in which both ends of the canvas are lapped with each other, securing stable bonding area and adhesive film thickness. As a result, local distortion of the canvas seam can be eliminated, and the area in which the rigidity of the endless joint increases can be reduced, providing an effect of improving the reliability of the endless joint.

Second Embodiment

Figure 14:
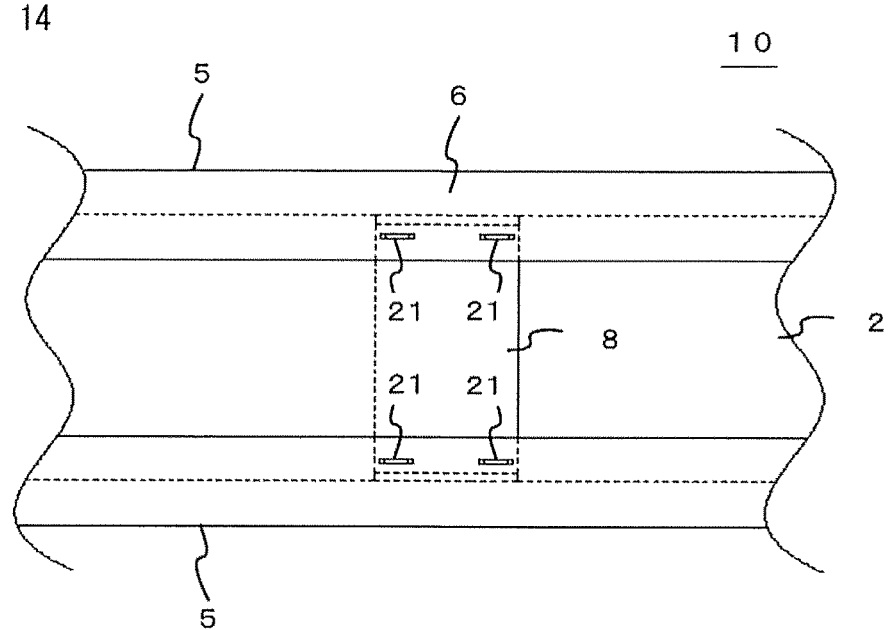
FIG. 14 A top view showing a joint of an endless handrail in accordance with a second embodiment of the invention.

An endless handrail in accordance with a second embodiment is described with reference to FIG. 14. FIG. 14 shows how the canvas lap part 6 is temporarily fixed with a metallic needle (such as staple). As shown in the first embodiment, in using a thermoplastic adhesive for bonding the canvas lap part, even when the lap side canvas 8 of the terminal A is inserted into the canvas dent 12 of the terminal B, maintaining the shape of the lap side canvas 8 is difficult. As such, the belt edge of the canvas lap part 6 is temporarily fixed with a staple 21 having a length such that the staple 21 does not protrude from within the belt edge 5, then the joint of the endless handrail is formed by hot pressing. As a result, the lap side canvas 8 can be placed in a uniform shape even after shaping by hot pressing, which secures stable bonding quality as with the first embodiment.

Third Embodiment

Figure 15:
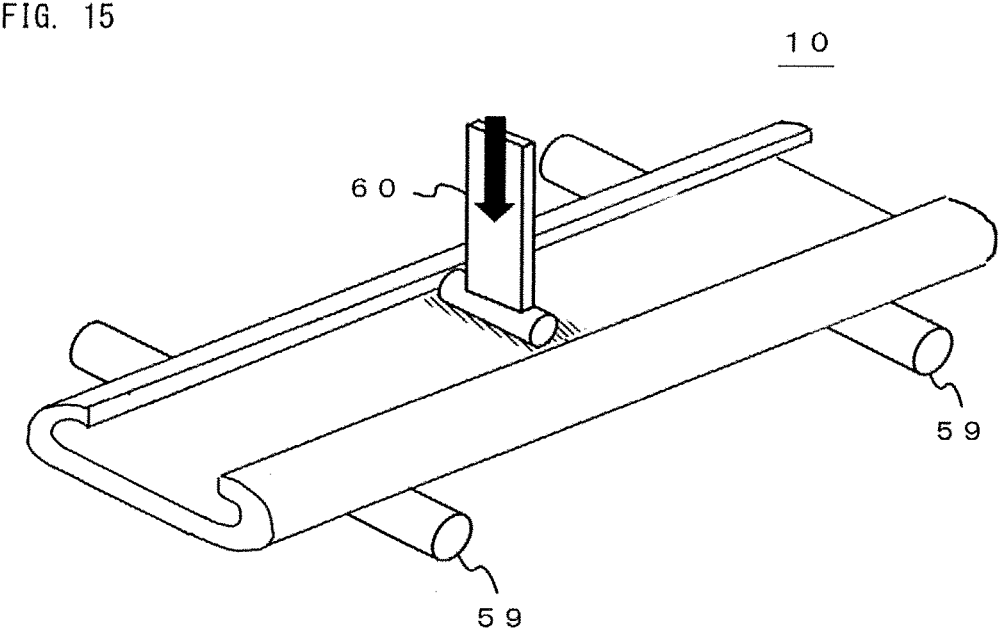
FIG. 15 A diagram showing how to measure the flexural rigidity of the handrail in the endless handrail.

In the endless structure using the patch, in order to disperse distortion concentrating at the canvas gap and to secure the bonding area of the patch, the patch needs a length of 100 mm or more in the length direction of the handrail. The lap-type endless structure can avoid occurrence of a gap and concentration of distortion at the canvas seam, so, the length of the canvas lap part 6 can be 50 mm or less. FIG. 15 shows how to measure the flexural rigidity of the handrail. Two supporting rollers 59 placed with a distance of about 200 mm in between are used to support the endless handrail 10 at two points. Using a universal testing machine, an indenter 60 is pressed into the center of the joint by 10 mm or so to measure the repulsion force.

Figures 16, 17:
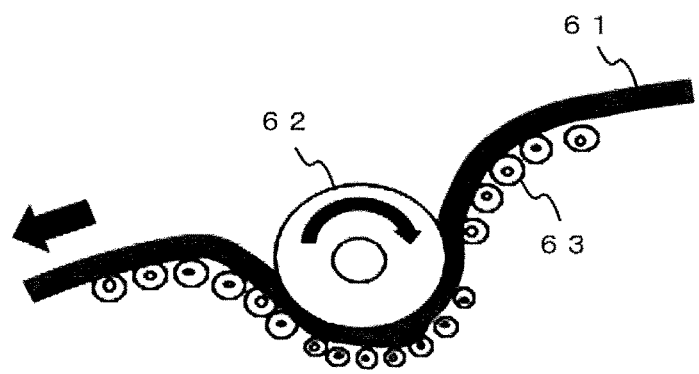
FIG. 16 A diagram showing a measured result of the flexural rigidity of the handrail in the endless handrail.
FIG. 17 A diagram showing a schematic cross section of a drive mechanism in the endless handrail.

FIG. 16 shows the measured result. The relation between the endless structure and the flexural rigidity of the handrail is shown. The flexural rigidity of the handrail of the joint in the lap-type endless structure is less than that in the patch-type endless structure. Also, reducing the lap part length can further reduce the flexural rigidity of the handrail of the joint. With the lap part length of 20 mm, the flexural rigidity of the handrail of the joint can be reduced by 40% and the ratio of the flexural rigidity of the handrail of the main body to the joint can be reduced to 1.3 in comparison with the patch-type endless structure.

The ratio of the flexural rigidity of the handrail of the main body to the joint is low, which reduces the stress occurring at the joint, providing an effect of improving the reliability of the endless handrail. The shorter the lap part length of the lap-type endless structure is, the lower the flexural rigidity of the handrail of the joint can be. However, when the lap part length is too small, the bonding area is reduced and the workability becomes worse. So, the lap part length is desirably 10 mm or more.

Fourth Embodiment

FIG. 17 is a schematic view of a sheave drive system that is the most common handrail drive system for escalator. In the sheave drive system, a drive sheave 62 transmits driving force to a handrail 61. Rotation of the drive sheave 62 causes the handrail 61 to move forward as if the handrail 61 is pushed out toward the traveling direction. The handrail 61 pushed out from the drive sheave 62 becomes in contact with a guide roller 63 arranged in an arching line.

In the conventional endless joint, since the difference of the flexural rigidity of the handrail between the main body and the joint is large, the handrail 61 passes the guide roller 63 while polygonally deforming as if floating above the guide roller 63. As a result, when the handrail 61 collides with the guide roller 63 as if landing on the guide roller 63, a flaw occurs on the surface of the handrail. The lap-type endless structure lowers the ratio of the flexural rigidity of the handrail of the main body to the joint, which can suppress deformation of the handrail 61 in passing the guide roller 63. The collision of the handrail with the guide roller is reduced, which can suppress occurrence of a flaw on the surface of the handrail.

Note that, according to the invention, the embodiments may be freely combined or the embodiments may be appropriately modified or omitted within the scope of the invention.

REFERENCE SIGNS LIST 1 thermoplastic resin member
2 canvas
3 main body
4 tension member
4A tension member
4B tension member
4a engagement part
4b engagement part
5 belt edge
5x belt edge
5y belt edge
6 canvas lap part
8 lap side canvas
10 endless handrail
10a dorsal part
10b abdominal part
11 urethane resin
11a removed part
11b removed part
12 canvas dent
13 heating block
14 cartridge heater
15 thermocouple
16 temperature controller
17 lower die
18 upper die
19 denting block
20 pressurizer
21 staple
22 supplement resin
23 fitting portion
30 belt-like molded product
50 machine room
51 steps
52 main frame
55 step drive chain
56 main shaft
57 driving machine
58 panel
59 supporting roller
60 indenter
61 handrail
62 drive sheave
63 guide roller
100 escalator
A terminal
B terminal

The invention claimed is:

1. An endless handrail manufacturing method comprising:
a first step of cutting the dorsal part on one end side and the dorsal part on the other end side of a belt-like molded product to expose a tension member on the one end side and a tension member on the other end side from the respective end portions;
a second step of heating the belt-like molded product after the first step on the one end side, then removing the resin member softened by the heating on the one end side over a defined width from the end face, and then exposing a canvas from the end portion on the one end side of the belt-like molded product;
a third step of heating the belt-like molded product after the first step on the other end side with a heating jig attached to the abdominal part to dent the abdominal part on the other end side of the belt-like molded product lower than the surrounding area;
a fourth step of applying an adhesive to the terminal on the one end side of the belt-like molded product formed through the second step or the terminal on the other end side of the belt-like molded product formed through the third step, then fitting the terminal on the one end side to the terminal on the other end side of the belt-like molded product; and
a fifth step of supplementing a resin to the fitting portion of the belt-like molded product formed through the fourth step, then hot pressing the fitting portion supplemented with the resin to fusion-bond the terminal on the one end side to the terminal on the other end side.

2. The endless handrail manufacturing method according to claim 1, further comprising a sixth step of forming a first engagement part in the tension member on the one end side of the belt-like molded product exposed through the first step and forming a second engagement part in the tension member on the other end side that is to be fitted to the first engagement part.

3. The endless handrail manufacturing method according to claim 1, further comprising a seventh step of temporarily fixing the fitting portion of the belt-like molded product formed through the fourth step with a metallic needle.

4. The endless handrail manufacturing method according to claim 2, further comprising a seventh step of temporarily fixing the fitting portion of the belt-like molded product formed through the fourth step with a metallic needle.

5. An endless handrail comprising:
a thermoplastic resin member in which a first curved portion and a second curved portion are formed opposing to each other with a flat portion in between and a seam is fusion-bonded on one side of a canvas lap part having a width;
a canvas bonded to the inner side of the thermoplastic resin member and covering the flat portion, the first curved portion and the second curved portion; and
a tension member including an engagement part formed at both ends and buried in the flat portion of the thermoplastic resin member,
wherein both ends of the canvas are lapped with each other at the canvas lap part, and
wherein at the canvas lap part, a portion of the canvas facing a lap side canvas is dented to form a canvas dent having a thickness of a canvas and an adhesive.

6. The endless handrail according to claim 5,
wherein the butt part of the engagement parts is provided on the anti-canvas lap part side with respect to the upper side end of the canvas.

7. An escalator comprising:
a driving machine placed in a machine room;
steps concatenated in an endless manner and moving up and down with rotational movement of the driving machine; and
the endless handrail according to claim 5 that rotates along with the steps moving up and down.

8. An escalator comprising:
a driving machine placed in a machine room;
steps concatenated in an endless manner and moving up and down with rotational movement of the driving machine; and
the endless handrail according to claim 6 that rotates along with the steps moving up and down.

9. An endless handrail manufacturing method comprising:
a first step of cutting a belt-like molded product on one end side and the other end side to a required length;

a second step of exposing a tension member of the one end side and a tension member on the other end side from the end portion;

a third step of cutting the tension members on the one end side and the other end side of the belt-like molded product exposed through the second step into a step-like shape to form an engagement part;

a fourth step of exposing a canvas from the end portion of the one end side of the belt-like molded product after the third step;

a fifth step of denting the abdominal part on the other end side of the belt-like molded product after the third step lower than the surrounding area;

a sixth step of fitting and bonding the terminal on the one end side of the belt-like molded product formed through the fourth step to the terminal on the other end side of the belt-like molded product formed through the fifth step; and a seventh step of fusion-bonding the fitting portion of the belt-like molded product formed through the sixth step.

10. The endless handrail manufacturing method according to claim 9, wherein the second step of exposing the tension members on the one end side and the other end side of the belt-like molded product is to expose the tension member by cutting the dorsal part on the one end side and the other end side of the belt-like molded product.

11. The endless handrail manufacturing method according to claim 9, wherein the fourth step of exposing the canvas from the end portion of the one end side of the belt-like molded product is to expose the canvas from the end portion of the one end side of the belt-like molded product by heating the belt-like molded product after the third step on the one end side and removing the resin member softened by the heating on the one end side over a defined width from the end face, or by removing the resin member on the one end side over a defined width from the end face by cutting.

12. The endless handrail manufacturing method according to claim 9, wherein the fifth step of denting the abdominal part on the other end side of the belt-like molded product lower than the surrounding area is to dent the abdominal part on the other end side of the belt-like molded product lower than the surrounding area by heating the belt-like molded product after the third step on the other end side with a heating jig attached to the abdominal part.

13. The endless handrail manufacturing method according to claim 9, wherein the sixth step of fitting and bonding the terminal on the one end side of the belt-like molded product formed through the fourth step to the terminal on the other end side of the belt-like molded product formed through the fifth step is to apply an adhesive to the terminal on the one end side of the belt-like molded product formed through the fourth step or the terminal on the other end side of the belt-like molded product formed through the fifth step, then fit the terminal on the one end side to the terminal on the other end side of the belt-like molded product.

14. The endless handrail manufacturing method according to claim 9, wherein the seventh step of fusion-bonding the fitting portion of the belt-like molded product is to fusion-bond the terminal on the one end side to the terminal on the other end side by supplementing a resin to the fitting portion of the belt-like molded product formed through the sixth step, then hot pressing the fitting portion supplemented with the resin.

\* \* \* \* \*